United States Patent [19]

Wang et al.

[11] Patent Number: 5,068,031

[45] Date of Patent: Nov. 26, 1991

[54] SLUDGE TREATMENT APPARATUS

[75] Inventors: Lawrence K. Wang; Mu H. S. Wang, both of Latham; Chong S. Hwang, Flushing; Harold Rhow, Hartsdale, all of N.Y.

[73] Assignees: Int'l Environmental Systems, Inc., Pittsfield, Mass.; Globe Environmental Protection, Inc., Flushing, N.Y.

[21] Appl. No.: 549,413

[22] Filed: Jul. 6, 1990

[51] Int. Cl.⁵ .............................................. C02F 11/14
[52] U.S. Cl. ................... 210/96.1; 210/197; 210/202; 210/221.2; 210/223; 210/260
[58] Field of Search ..................... 210/703–705, 210/96.1, 195.1, 196, 197, 198.1, 202, 203, 205, 220, 222, 221.1, 221.2, 260, 262, 775, 525, 530, 223

[56] References Cited

U.S. PATENT DOCUMENTS

| | | | |
|---|---|---|---|
| 3,171,804 | 3/1965 | Rice | 210/724 |
| 3,307,701 | 3/1967 | Krofta | 210/195.1 |
| 3,403,096 | 9/1968 | Mackrle et al. | 210/202 |
| 3,408,288 | 10/1968 | Messa | 210/202 |
| 3,429,442 | 2/1969 | Mackrle et al. | 210/202 |
| 3,820,659 | 6/1974 | Parlette | 210/195 |
| 4,022,696 | 5/1977 | Krofta | 210/520 |
| 4,151,093 | 4/1979 | Krofta | 210/386 |
| 4,157,952 | 6/1979 | Krofta | 209/170 |
| 4,184,967 | 1/1980 | Krofta | 210/525 |
| 4,303,517 | 12/1981 | Love et al. | 210/208 |
| 4,377,485 | 3/1983 | Krofta | 210/704 |
| 4,626,345 | 12/1986 | Krofta | 210/104 |
| 4,626,346 | 12/1986 | Hall | 210/110 |
| 4,673,494 | 7/1987 | Krofta | 210/202 |
| 4,673,498 | 6/1987 | Swinney et al. | 210/275 |
| 4,673,500 | 6/1987 | Hoofnagle et al. | 210/307 |
| 4,931,175 | 6/1990 | Krofta | 210/86 |

OTHER PUBLICATIONS

The U.S. Dept. of Commerce, National Technical Information Service (NTIS) Report #PB 89-158,398 (1988).

L. K. Wang, U.S. Department of Commerce, National Technical Information Service, Springfield, Virginia, U.S.A. Technical Report No. PB89-158398/AS, Oct. 1988.

L. K. Wang and W. J. Mahoney, Proceedings of the 44th Industrial Waste Conference, pp. 655–666, May 1989.

L. K. Wang and M. H. S. Wang and W. J. Mahoney, Proceedings of the 44th Industrial Waste Conference, pp. 667–673, May 1989.

L. K. Wang and M. H. S. Wang, Proceedings of the 44th Industrial Waste Conference, pp. 493–504, May 1989.

M. Krofta and L. K. Wang, Journal of New England Water Works Associates, pp. 265–284, Sept. 1985.

*Primary Examiner*—Peter Hruskoci
*Attorney, Agent, or Firm*—Birch, Stewart, Kolasch & Birch

[57] ABSTRACT

A sludge treatment multi-stage process and apparatus thereof for sludge concentration and liquid stream treatment which includes chemical feeding, static mixing, chemical monitoring and optimization, built-in gas pressurization, hydraulic flocculation, grit settling, multiple stage upward flotation thickening, downward gravity thickening, and final magnetic or electrical treatment to produce a highly concentrated sludge slurry and a treated effluent. A majority of floated, settled and thickened sludges are collected by a travelling combined scooping-scraping means and subsequently dewatered and dried and all necessary unit processes and unit operations are incorporated into an apparatus with common walls and drive mechanisms for improving the sludge and water treatment efficiency, reducing secondary pollution caused by scums/sludges, and eliminating the needs of a separate mixer, monitor, flocculator, pressure vessel, flotation thickening clarifier, gravity thickening clarifier, aerator, biofouling preventor, scale controller, corrosion controller, and multiple apparatus for various modes of operations.

3 Claims, 3 Drawing Sheets

SLUDGE TREATMENT APPARATUS

BACKGROUND OF THE INVENTION

1. Field of the Invention

The present invention relates to a sludge treatment process and an apparatus thereof and more particularly, to a multistage process and a package apparatus thereof for mainly concentration of suspended sludges but also for removal of dissolved, colloidal, suspended, volatile, and living contaminants from liquid.

2. Description of the Prior Art

Various types of sludge treatment processes are well known in the art. In such processes, the suspended contaminants in liquid sludge stream are commonly removed by a gravity thickening separation procedure wherein the particles in suspension have a specific gravity greater than that of the liquid in which they are suspended. Therefore, gravity thickening takes advantage of the difference in specific gravity between the solids and water. A gravity thickener normally consists of two truss-type steel scraper arms mounted on a hollow pipe shaft keyed to a motorized hoist mechanism. A truss-type bridge is fastened to the tank walls or to steel or concrete columns. The bridge spans the tank, and supports the entire mechanism. The thickener resembles a conventional circular clarifier with the exception of having a greater bottom slope. Slope enters at the middle of the thickener and the solids settle into a sludge blanket at the bottom. The concentrated sludge is very gently agitated by the moving rake which dislodges gas bubbles and prevents bridging of the sludge solids. It also keeps the sludge moving toward the center well from which it is removed. Supernatant liquor passes over an effluent weir around the circumference of the thickener. It has been shown that in the operation of gravity thickeners it is desirable to keep a sufficiently high flow of fresh liquid entering the concentrator to prevent septic conditions and resulting odors from developing.

When the specific gravity of the suspended contaminants is similar to that of the water, then a dissolved air flotation thickening procedure is more effective and is employed. Several types of prior art flotation processes have been developed for the separation of suspended particulates from a liquid sludge stream. In a conventional dissolved air flotation system, a recycled subnatant flow is pressurized from 30 to 70 pound per square inch and then saturated with air in a separate pressure tank. The pressurized effluent is then mixed with the influent sludge and subsequently released into the flotation tank. The excess dissolved air then separates from solution, which is now under atmospheric pressure, and the minute (average diameter 80 microns) rising gas bubbles attach themselves to particles which form the floating sludge blanket. The thickened blanket is skimmed off and pumped to the downstream sludge handling facilities while the subnatant is returned to the plant. Polyelectrolytes are frequently used as flotation aids, to enhance performance and create a thicker sludge blanket.

It has been a standard practice for engineers to construct separate liquid treatment units to remove dissolved, colloidal, suspended, volatile and living contaminants, and to construct separate gravity thickening units for heavy sludges such as primary sludges, and separate flotation thickening units for light weight activated sludges.

Neither such conventional gravity thickening systems nor conventional dissolved air flotation thickening systems are perfect for sludge concentration. An ideal sludge thickening system shall include both gravity thickening and flotation thickening.

Particularly, such conventional flotation thickening systems require separate pressure vessels for dissolving gas and for gas bubble generation. The capital costs and land space requirements of such conventional flotation thickening systems and conventional gravity thickening systems are both high.

Still such conventional flotation thickening systems are not flexible for operation. An ideal flotation thickening system shall be able to be operated under any operational modes, such as full flow pressurization, partial flow pressurization, or recycle flow pressurization.

Such conventional water and wastewater treatment processes and apparatuses thereof are described in the U.S. Pat. No. 3,171,804 to Rice, U.S. Pat. No. 3,307,701 to Krofta, U.S. Pat. No. 3,820,659 to Parlette, U.S. Pat. No. 4,022,696 to Krofta, U.S. Pat. No. 4,151,093 to Krofta, U.S. Pat. No. 4,157,952 to Krofta, U.S. Pat. No. 4,184,967 to Krofta, U.S. Pat. No. 4,303,517 to Love et al, U.S. Pat. No. 4,377,485 to Krofta, U.S. Pat. No. 4,626,345 to Krofta, U.S. Pat. No. 4,626,346 to Hall, U.S. Pat. No. 4,673,494 to Krofta, U.S. Pat. No. 4,673,498 to Swinney et al, U.S. Pat. No. 4,673,500 to Hoofnagle et al and L.K. Wang, Using Air Flotation and Filtration in Color and Giardia removal. U.S. Department of Commerce, National Technical Information Service, Springfield, Virginia, USA. Technical Report No. PB89-158398/AS. October 1988. L.K. Wang and W.J. Mahoney. Treatment of Storm Run-off by Oil-Water Separation, Flotation, Filtration and Adsorption, Part A: Wastewater Treatment. Proceedings of the 44th Industrial Waste Conference, P. 655–666, May 1989. L.K. Wang, M.H.S. Wang and W.J. Mahoney. Treatment of Storm Run-off by Oil-Water Separation, Flotation, Filtration and Adsorption: Part B: Waste Sludge Management. Proceedings of the 44th Industrial Waste COnference, P. 667–673, May 1989. L.K. Wang, and M.H.S. Wang, bubble Dynamics and Air dispersion Mechanisms of Air Flotation Process Systems, Part A: Material Balances. Proceedings of the 44th Industrial Waste Conference, P. 493–504, May 1989. M. Krofta and L.K. Wang, Application of Dissolved Air Flotation to the Lenox Massachusetts Water Supply: Sludge Thickening by Flotation or Lagoon. Journal of New England Water Works Association, P. 265–284, September 1985.

SUMMARY OF THE INVENTION

Accordingly, it is an object of the present invention to provide an improved sludge thickening apparatus.

Another object of the present invention to provide a combined process system and apparatus having a number of unique design features for improving liquid treatment efficiency and cost saving.

A further object of the present invention is to provide a combined flotation-gravity sludge treating multistage apparatus for eliminating the need of many separate treatment units or devices in comparable conventional sludge treatment processes such as a (a) separate gravity thickening unit, (b) separate flotation thickening unit, (c) chain skimmer mechanism at top, (d) chain sludge collector at bottom and (e) separate liquid treatment unit for treating the reject wastewater. While the aforementioned conventional treatment units or devices may be eliminated for cost saving, one or more of them may be adopted to the present invention as a standby when desired or when the duplicate units are required by the monitoring agencies.

Still another object of the present invention is to provide a combined flotation-gravity thickening apparatus having a pressurized water flow in a pressure vessel such as a gas dissolving tube which is inside of the apparatus and generates gas bubbles depending on the contaminants to be removed so as to thicken sludge as well as to treat the remaining wastewater. The built-in pressure vessel within the apparatus is for more efficient operation and cost saving.

Yet another object of the present invention is to provide a combined flotation-gravity thickening apparatus including (a) special chemical monitor which accepts signals from a streaming current detecting cell, an optical density cell, a pH probe and the combination thereof for chemical optimization; (b) the pressurized water to be directed to a flotation chamber being maintained under pressure until the moment of its release in the flotation chamber without long distance complication since this is accomplished by a built-in pressure vessel; (c) special multiple stage pressure relief pipes in the flotation chamber (i.e. the outer tank between an inner rail and a baffle), rather than in the conduit leading to that flotation chamber (as in the case of conventional circular flotation apparatus), which ensures that the air bubbles released in the flotation chamber will be as small as possible, thereby improving aeration and flotation; (d) an in-line electrical or magnetic water treater for control of biological fouling, scale and corrosion; (e) a traveling sludge scoop for removing the floated sludge on the water surface; (f) a traveling scraper blade for collecting the settled sludge from the sludge hopper at the bottom of said apparatus; and (g) means for operating the present invention under the recycle flow pressurization mode, partial flow pressurization mode, or full-flow pressurization.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a combined flotation-gravity multi-stage process and apparatus which includes flotation thickening, gravity thickening, chemical monitoring, built-in gas pressurization under different modes of operations rejection wastewater treatment and combined traveling means for collecting both the floated sludge at top and the settled sludge at bottom of the apparatus so as to concentrate suspended sludge in a dilute liquid sludge stream and remove dissolved, colloidal, volatile, suspended and living contaminants from the reject, wastewater. That is, a majority of original and newly formed insoluble suspended sludges in the dilute liquid sludge stream are collected by the combined effect of gravity and flotation clarification and all necessary unit processes and unit operations including clarification, monitoring, gas pressurization, operational mode variation, floated sludge removal, settled sludge removal, reject wastewater treatment are incorporated into an apparatus with common walls and drive mechanisms for improving the sludge treatment efficiency, and thereby eliminating the needs of various separate components including a gravity thickener, a flotation thickener, chemical monitors, a pressure vessel, a floated sludge collector, a settled sludge collector, and a reject treatment unit.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
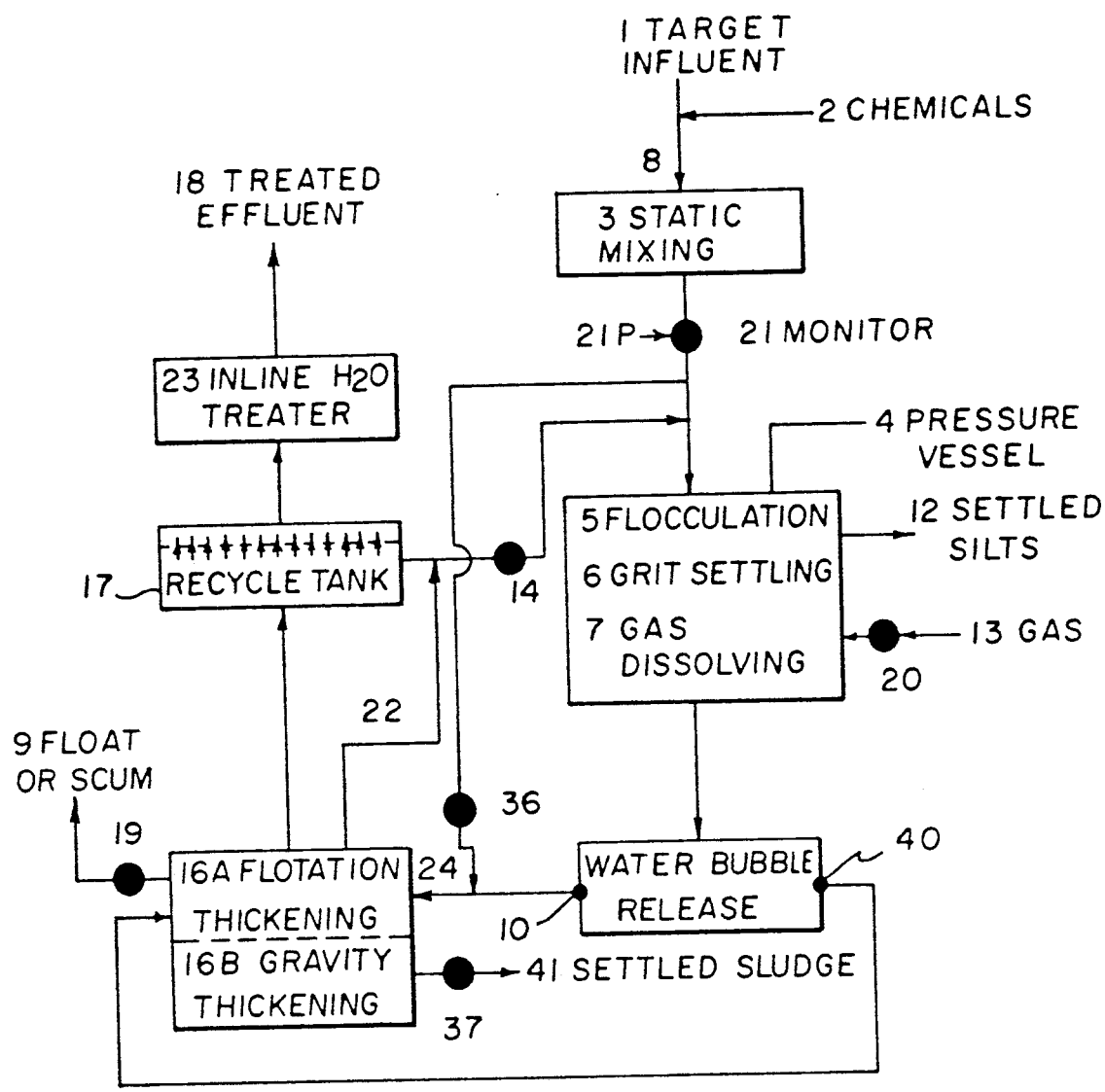
FIG. 1 shows the overall process according to the present invention.
Figure 2:
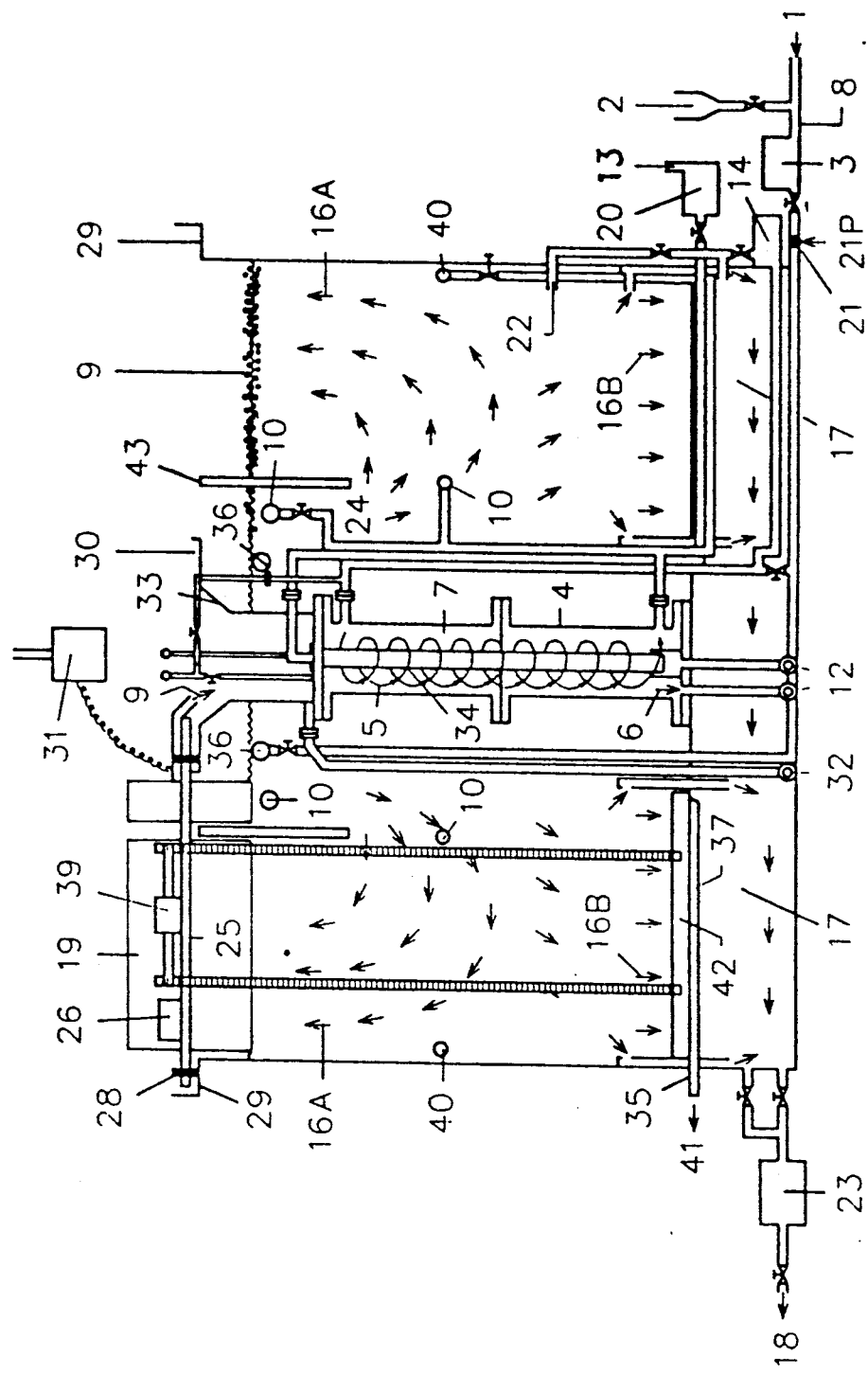
FIG. 2 is sectional view of the apparatus according to the present invention.
Figure 3:
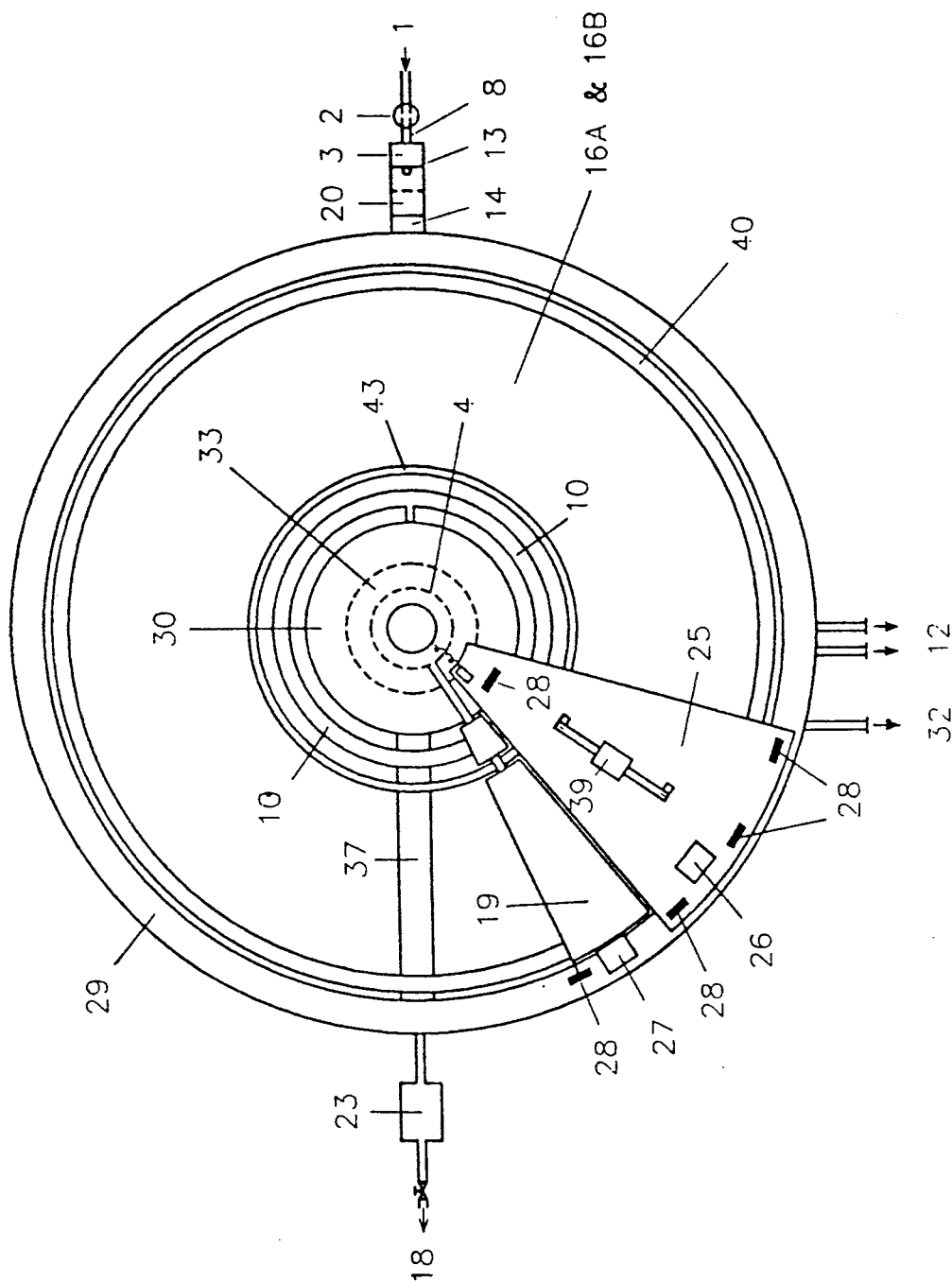
FIG. 3 is a top plan view according to the apparatus of the present invention.

Referring now in detail to the drawings for the purpose of illustrating preferred embodiments of the present invention, the sludge treatment process an the apparatus thereof are shown in the process steps of FIGS. 1, 2, and 3, which includes the steps of chemical feeding, static mixing, monitoring, flocculating, grit settling, and gas dissolving in a dissolving tube, water-bubble releasing, flotation thickening, gravity thickening, effluent recycling and effluent conditioning, for sludge concentration and reject wastewater treatment. As shown in FIG. 1, the target influent 1 is primarily liquid sludge stream but also can be water or wastewater. First chemicals 2 can be added to the target influent 1 when necessary. The influent-chemical mixture is pumped through an inlet pipe 8 to a static mixing member 3, and a chemical monitor 21, and then to a cylindrical pressure vessel 4 at a tangential direction where flocculation 5 and grit settling 6 occur simultaneously. The static mixing can be replaced by a conventional mechanical mixing method or a fluidizing mixing method.

Gas or air 13 is compressed by a gas compressor 20 and added in varied amounts to the pressure vessel 4 which is inside of the main apparatus. The gas 13 is selected from the group consisting of gaseous air, nitrogen, oxygen and combination thereof. The settled grits 12 disposed at the bottom of the pressure vessel 4 are discharged periodically to a scum and sludge collector (not shown). A measuring member can be provided on the apparatus for measuring the flow rate of the water and various gases in the inlet pipe 8, the pressure vessel 4 containing compressed gas, and other inlets and outlets. The water from recycle tank 7 or the flotation clarified water 22 is pumped into the inlet of the pressure vessel 4 by a pressure pump 14 at the same time when the gas, such as air, is pumped by a gas compressor 20 to the same pressure vessel 4 for dissolving the gas 13 into the water under pressure. An effluent of the pressure vessel 4 passes through unique water-bubble release rings 10 and 40, and enters a flotation thickening zone 16A and gravity thickening zone 16B from a water bubble release zone 24 where it meets the by-passed influent 1 from a influent distribution means 36 as shown in FIGS. 1 and 2. The mixture of the by-passed influent from the distribution means 36 and the pressure vessel effluent from the release rings 10 and 40 flow to the dissolved gas flotation thickening zone 16A from where the flotation effluent flows downward to the gravity thickening zone 16B, then to a recycle tank 17. The floated scum from the dissolved gas flotation thickening zone 16A is collected by a sludge scoop collector 19. Part of the effluent from the recycle tank 17 is recycled by a pressure pump 14 to the pressure vessel 4 with gas injection from the gas compressor 20.

The heavy sludge settled from the gravity thickening zone 16B is collected and thickened in a sludge hopper 37 by a traveling sludge scraper blade 42, and then discharged to a drain 35.

As shown in FIGS. 1 and 2, the remaining effluent of the recycle tank 17 is first treated by an in-line electronic or magnetic water treater 23 and then discharged as a treated effluent 18. Alternatively, a flotation clarified water 22 from the dissolved gas flotation 16A can be recycled by the pressure pump 14 to the pressure vessel 4 for bubble generation so the recycle tank 17 can be eliminated for cost saving. The float and sludge in the sludge scoop collector 19 is collected as the thickened sludge or float 9.

The unique chemical monitor 21 monitors and controls the pH, suspended solids and streaming current of the coagulated sludge stream entering the pressure vessel 4 and influent distribution means 36. The chemical monitor 21 is especially useful when treating liquid sludge that requires polyelectrolyte for coagulation, or maintaining optimum pH ranges for the flotation clarification of the liquid. The monitor 21 also feeds pH buffer chemical 21P as a fixed but adjustable percentage of the primary coagulant dosage or in direct response to measured pH. The said monitor 21 is capable of reacting quickly to rapid and wide optical density swings and accepts the signals from a streaming current detecting cell, an optical detecting cell and/or a pH meter for flotation chemical control. The additional in-line water treater 23 can be installed before the pressure vessel 4.

The unique in-line electrical or magnetic water treater 23 has no moving parts, and inhibits biological fouling and corrosion. The in-line water treater 23 also descales the liquid treatment system and equipment.

As shown in FIGS. 2 and 3, the baffle ring 43 between the water-bubble release zone 24 and the flotation thickening zone 16A may be about 1 to 2 feet below the liquid surface. A moving carriage 25 has a platform on which are mounted a first driving motor 26 for the entire moving carriage 25, the sludge scoop collector 19, the sludge scraper mechanism 39 for the scraper blade 42, and a second driving motor 27 for rotating the sludge scoop collector 19. The driving motor 26 rotates the moving carriage 25 with the rollers 28 on the outer tank 29 and the inner rail 30. The rotation direction of the moving carriage 25 can be either counterclockwise or clockwise. The rotation speeds of both the moving carriage 25 and the sludge scoop collector 19 are adjustable. There are rollers 28 carrying the weight of the entire moving carriage 25 uniformly and rolling on an outer rail 29 and an inner rail 30.

As shown in FIGS. 2 and 3, the top and center of the apparatus according to the present invention there is an universal joint 31 for delivering power source to the entire apparatus. Immediately below the universal joint 31, there is a sludge collecting member 33 for receiving and discharging the wet sludge from the sludge scoop collector 19 to a lower location 32. At the center but below the sludge collecting member 33, there is the pressure vessel 4 as the gas dissolving tube. The center of the pressure vessel 4 is a plastic porous tube 34 for uniform distribution and dissolution of compressed gas into water throughout the entire pressure vessel 4. The pressure vessel 4 and the sludge collecting member 33 are supported by stainless steel angles (not shown), bolted at the center of the entire apparatus.

According to the present invention, in the process of the present invention, suspended solids such as primary sludge, waste activated sludge and paper fibers are mixed with chemicals and thickened by combined effect of upward flotation thickening and downward gravity thickening. Colloidal substances are coagulated and destabilized. The remaining liquid passes through the recycle tank 17 and the effluent water treater 23 before discharging as the treated effluent 18. The settled and thickened sludge and the floated and thickened scum are collected from the sludge hopper 37 disposed at the tank bottom by gravity, and from the tank water surface by the sludge scoop 19, respectively. Both the thickened float scums 9 and sludges 41 are chemically conditioned, dewatered, and dried for final disposal.

The unique features of the present invention which have been described are: (a) the monitor automatically adjusts and optimizes the chemical dosages; (b) the pressure vessel is a built-in reactor for space-saving, cost saving and high performance for gas dissolving; (c) multi-stage, water-bubble release enhances the flotation thickening; (d) gravity thickening follows the flotation thickening for improving the thickening performance; (e) moving bridge collects the floated scum with a traveling/rotating sludge scoop and collects the settled sludge with a traveling scraper blade simultaneously; (f) in-line water treater polishes the treated effluent. Accordingly, the present invention can thicken the light weight sludges such as the waste activated sludge or paper fibers, as well as the comparatively heavier weight sludges, such as the primary sludge, grits, etc. The present invention also simultaneously concentrates the sludge and treats the reject wastewater, thus produces no secondary pollution.

Still another unique feature of the present invention is its flexibility in process operation. Referring to FIGS. 1, 2 and 3, the process and the apparatus thereof can be operated under the full flow pressurization mode if the influent 1 and chemical 2 are totally pumped to the pressure vessel 4 through the monitor 21, when the recycle pressure pump 14 is off. Under the partial flow pressurization mode, a portion of the mixture of target influent 1 and the chemical 2 is pumped to the pressure vessel 4, and the remaining portion of the mixture of the influent 1 and the chemical 2 by-passes the pressure vessel 4 going to the flotation thickening zone 16A through the influent distribution ring 36, when recycle pump 14 is off. Under the recycle flow pressurization mode, entire mixture of the influent 1 and the chemical 2 bypasses the pressure vessel 4, and enters the flotation thickening zone 16A through the influent distribution ring 36, and the recycle pump 14 feeds the clarified water 22 or the water in the recycle tank 7 to the pressure vessel 4 for pressurization and gas dissolving. Accordingly, the present invention can be operated under the modes of (a) full flow pressurization; (b) partial flow pressurization; (c) recycle flow pressurization; and (d) any combinations thereof.

For the invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. An apparatus for treating liquid sludge, comprising in combination:
   an inlet pipe with an in-line static mixing member for introducing said liquid sludge into said apparatus,
   means for feeding chemical to said inlet pipe carrying said liquid sludge,
   a built-in flotation monitor monitoring pH, streaming current, suspended solids, turbidity, and optical density for and adjusting the feeding of said chemical,
   a cylindrical outer tank having the bottom thereof as an outside wall of said apparatus,
   means for connecting said flotation monitor to said inlet pipe,
   means for feeding pH buffer chemical to said inlet pipe in response to said flotation monitor,
   a cylindrical inner pressure vessel disposed within said outer tank for flocculation, grit settling and gas dissolving,
   means for introducing said liquid sludge tangentially into the top of the cylindrical inner pressure vessel to form a pressurized liquid sludge containing compressed gas for releasing by releasing means into said outer tank,
   means for removing settled heavy silts, and sludges from the bottom of said pressure vessel,
   a cylindrical inner porous tube positioned within said pressure vessel for gas dissolution under the pressure,
   means for introducing gas to be pressurized through said inner porous tube into said pressure vessel for dissolving gas,
   means for measuring the flow rates of said liquid sludge and various gases in said inlet pipe, pressure vessel, and other inlets or outlets,
   releasing means for introducing the pressurized liquid sludge containing compressed gas to be depressurized and clarified from said pressure vessel into said outer tank for bubble generation and flotation-gravity clarification,
   an influent distribution means for introducing non-pressurized liquid sludge into said outer tank for flotation-gravity clarification,
   means for operating the flotation-gravity clarification under full flow pressurization mode, partial flow pressurization mode, recycle flow pressurization mode, or combinations thereof,
   traveling sludge scooping means for removing floated sludge from the liquid surface of said outer tank,
   sludge hopper and traveling scraper blade means for removing settled, heavy sludges from the bottom of said outer tank,
   sludge discharge means for transporting said floated sludge and settled sludge through a sludge collection member to a dewatering device,
   a recycle tank over the bottom of said outer tank for collection of flotation-gravity clarified effluent and for partial recirculation of clarified effluent,
   an outlet for discharging said flotation-gravity clarified water from said recycle tank to an in-line water treater and then to discharge as a treated effluent,
   a moving carriage having a platform supported between the upper portion of the wall of said outer tank and the upper portion of the wall of said pressure vessel so as to hold said releasing means, sludge scooping and scraping means, and driving motors,
   means for circular moving said moving carriage together with said releasing means, sludge scooping, and scraping means, and driving motors along outer and inner rails on said apparatus and around the vertical axis of said apparatus,
   means for recycling a portion of water from said recycle tank or said flotation clarification effluent into said pressure vessel to form the liquid sludge to be pressurized, then depressurized and clarified, and
   means for generating an electronic or magnetic field in the in-line water treater for control of biological fouling, scaling and corrosion.

2. The apparatus of claim 1, wherein the pressure vessel is constructed and arranged to operation in conjunction with another pressure vessel outside said apparatus.

3. The apparatus of claim 1, wherein the releasing means for introducing the pressurized liquid sludge containing compressed gas to be depressurized and clarified from said pressure vessel into said outer tank is either single stage releasing means or multiple stage releasing means.

* * * * *